Aug. 29, 1933.  R. B. FAGEOL  1,924,984
MULTIWHEEL ROAD VEHICLE
Filed Dec. 12, 1929  4 Sheets-Sheet 1

Inventor
Rollie B. Fageol
By
Strauch & Hoffman
Attorneys

Patented Aug. 29, 1933

1,924,984

UNITED STATES PATENT OFFICE 1,924,984

MULTIWHEEL ROAD VEHICLE

Rollie B. Fageol, Los Angeles, Calif., assignor, by mesne assignments, to Automotive Engineering Corporation, a corporation of Delaware Application December 12, 1929
Serial No. 413,647

20 Claims. (Cl. 180—22)

The present invention relates to multi-wheel road vehicles.

More particularly the invention relates to multi-wheel constructions preferably of the type constructed from standard vehicles having only a single drive axle by the addition thereto of a frame extension and a dead axle. However, the invention is capable of ready application to new vehicle constructions.

Still more specifically, the present invention relates to multi-wheel vehicle constructions embodying a driven axle and a dead axle, which axles are yieldably connected with the vehicle frame by spring assemblies which have a pivotal connection with the frame intermediate their ends, and which, at their opposite ends, are connected to said axles in suspended relation thereto by ball hangers, and in which a Hotchkiss drive is utilized to propel the vehicle. The invention aims to resist the torque reactions independently of the springs which, because of the use of ball hangers cannot serve this function, and at the same time utilize the torque resisting means to position the drive axle endwise of the frame without substantially restricting the flexibility of the construction.

The present invention aims to provide a thoroughly practical multi-wheel vehicle construction that may be readily and relatively inexpensively fabricated from a standard two axle vehicle construction of the Hotchkiss type by the addition thereto of relatively few and simple parts, and without necessitating any material change in the Hotchkiss drive.

A primary object of the present invention, accordingly, is to provide a multi-wheel road vehicle construction by the addition of relatively few and simple parts to a standard four wheel vehicle embodying a Hotchkiss drive, whereby a multi-wheel vehicle construction is provided embodying a pair of axles yieldably connected with the vehicle frame by spring assemblies whose opposite ends are flexibly connected to said axles in suspended relation thereto, and without change in the drive provided for the four wheel vehicle.

A still further object of the invention is to provide a multi-wheel road vehicle construction embodying a pair of axles provided respectively with driven and non-driven wheels, said axles yieldably connected to the frame by under slung spring assemblies having a pivotal connection with the vehicle frame and flexible hanger connections with said axles, said vehicle construction being readily constructed from a standard four wheel vehicle construction of the Hotchkiss drive type.

A still further object of the invention is to provide a multi-wheel road vehicle embodying a flexible truck construction comprising axles connected to the ends of spring by universal hangers, and including connections between the vehicle frame and one of said axles separate from the flexible drive shaft for restricting movement thereof longitudinally as well as transversely of said frame.

A still further object of the invention is to provide a multi-wheel road vehicle comprising a drive axle and a dead axle respectively provided with driven and non-driven wheels, an equalized emergency brake construction associated with said driven wheels, and equalized service brake constructions associated with said driven wheels, said non-driven wheels provided with service brakes, and operative connections between said service brakes for said driven wheels and said service brakes for said non-driven wheels.

A still further object of the invention is to provide a multi-wheel road vehicle construction by the addition of relatively few parts to a standard four wheel vehicle, said additional parts comprising an extension frame of such construction and associated with the standard frame in such manner as to substantially reinforce same.

A still further object of the invention is to provide a multi-wheel road vehicle construction comprising a drive axle and a dead axle respectively provided with driven and non-driven wheels, said axles yieldably connected with the vehicle frame by spring assemblies whose opposite ends are flexibly connected to said axles in suspended relation thereto, and yieldable means associated with said spring assemblies and said dead axle for maintaining said dead axle substantially in alinement with said drive axle.

Still further objects of the invention will appear as the description thereof proceeds with reference to the accompanying drawings and wherein:

Figure 8 is a fragmental longitudinal sectional view disclosing a modified form of spring suspension.

The novel multi-wheel vehicle construction in one of the embodiments thereof about to be described is particularly intended to be fabricated from an ordinary four wheel road vehicle of the motor driven type, in which the rear end thereof is supported by a single drive axle carried by a single pair of wheels and in which said drive axle is driven by a laterally flexible and extensible drive shaft. Standard vehicles of the character just referred to may in accordance with the present invention be readily converted into multi-wheel vehicles with their attendant advantages by the addition thereto of relatively few simple parts about to be described. It should be understood however that the invention may be embodied in a vehicle that is constructed de novo, rather than by simply converting a standard four wheel construction into a multi-wheel construction.

Figure 1:
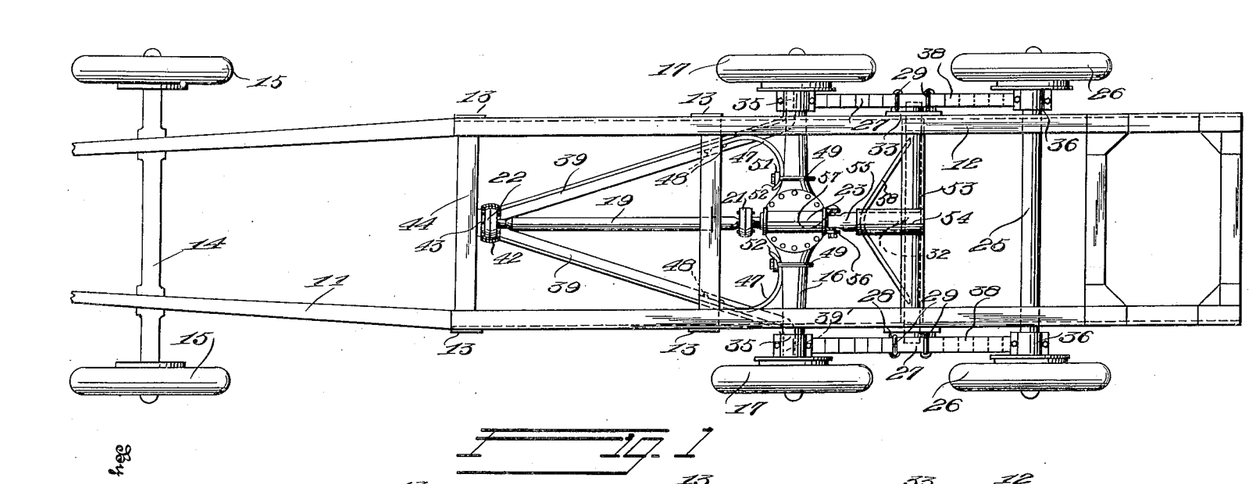
Figure 1 is a top plan view of the chassis of a multi-wheel road vehicle constructed in accordance with one of the embodiments of my invention.
Figure 2:
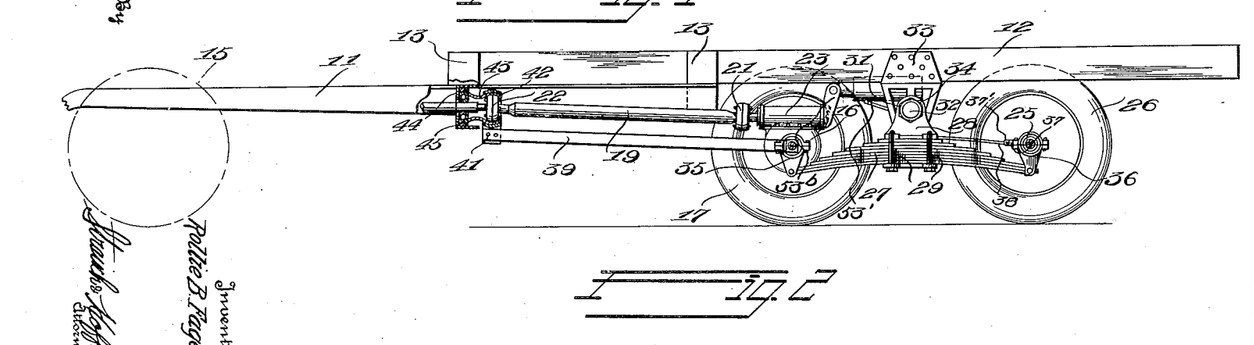
Figure 2 is a vertical longitudinal sectional view taken on a plane cutting the axles immediately adjacent the wheels on the near side of Figure 1, certain parts being broken away and in section for clearness of disclosure, the vehicle being indicated in unloaded condition.
Figure 3:
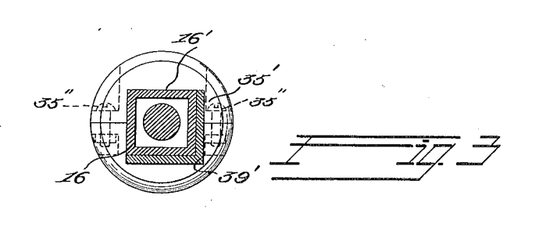
Figure 3 is a transverse sectional view of the drive axle disclosing one of the ball hanger seats and the connection of one of one of the radius rods with said axle and said seat.

Referring to the accompanying drawings and referring first to Figures 1 to 3 the numeral 11 designates the chassis frame of a standard vehicle which is to be converted in the manner presently to be described into a multi-wheel road vehicle having a substantially longer wheel base. This longer wheel base is preferably secured by attaching to frame 11 an extension frame 12 which as indicated is disposed in lapped relation to frame 11 and secured thereto in any desired manner, as by plates 13.

While extension frame 12 is disclosed in lapping relation to the top edge surface of frame 11 it may be in lapped relation to the sides thereof as disclosed in my copending application serial No. 383,414, filed August 3, 1929.

The forward end of frame 11 is supported by the standard front axle 14 provided with the dirigible wheels 15 controlled in the usual manner from a cab or operator's seat of any usual or desired construction supported on the chassis.

Disposed adjacent the rear end of frame 11 is a drive axle housing 16 containing a drive axle and differential of well known form, which in the fabrication of the multi-wheel construction, assumes its original position relative to frame 11 and the transmission mechanism supported thereby. The housing 16 contains the live axle sections operatively connected to the standard drive wheels 17. The axle sections are differentially driven by the differential mechanism within housing 16 and to which mechanism the rear end of the usual drive shaft 19 of the Hotchkiss type is operatively connected, the drive shaft 19 embodying telescoping sections and connected adjacent the differential mechanism by a universal joint 21 and provided adjacent the transmission mechanism or a midship frame bearing with a universal joint 22 in well known manner. As disclosed a worm drive 23 of usual construction is provided for the drive axle but a bevel gear drive of well known construction may be employed as may be desired.

The drive axle and drive shaft associated therewith, as herein above described, are of standard construction and while only one embodiment is disclosed various forms of drive axles and associated drive shafts of the Hotchkiss type may be utilized in the construction of a multi-wheel road vehicle in accordance with the present invention.

The present invention embodies a non-driven or dead axle 25 supported by non-driven wheels 26, which may be per se of standard construction. The axle 25 is connected with axle 16 rearwardly thereof and to the vehicle frame extension 12 by leaf spring assemblies 27. The spring assemblies 27 may be those which, in the standard construction, yieldably connect drive axle 16 with frame 11 and which, as is well known, serve also to resist the torque and brake reactions on axle 16, or spring assemblies 27 may be of special construction. Said drive axle is driven by the extensible drive shaft 19 and the spring assemblies 27 are associated in the novel construction with axles 16 and 25 and frame extension 12 in a manner about to be described, providing a construction of required stability and great flexibility, which permits relatively free movement of wheels 17 and 26 as they move over road irregularities without undue strain on the connecting parts. The spring assemblies 27 are supported intermediate their ends on saddles 28 and secured thereto by U-bolts 29. Saddles 28 are pivotally connected, as indicated at 31, to the opposite ends of a trunnion shaft 32 outwardly of brackets 33 secured to extension 12, and through which brackets shaft 32 extends, the saddles 28 being removably maintained in rotatable engagement with shaft 32 by nuts 34 threaded on the opposite ends of shaft 32. The opposite ends of the spring assemblies 27 in the above described pivotal connection with the vehicle frame are disposed substantially below axles 16 and 25 or in suspended relation thereto, as clearly indicated in Figure 2, and said ends are connected with axles 16 and 25 by hangers 35 and 36 each of which is connected to an axle by a ball or universal joint at one end and pivotally connected to an end of the spring at the other end, as also represented in said figure.

The hangers 35 may be of the construction disclosed in my copending application above referred to. The hangers 36 are of the same general construction as hangers 35, but the upper cap portions thereof, as indicated in Figure 2, are provided with extensions 37 provided with laterally spaced pintle supporting eyes 37'. Pivotally connected between eyes 37' by a suitable pintle is the rear end of a spring leaf 38 which may be an extension of the top leaf of the adjacent spring assembly 27, as indicated in Figure 2, or may be an additional spring leaf whose forward end is rigidly united with spring assembly 27 by the U-bolts 29.

The spring assemblies 27, as well as the spring leaf 38, are preferably secured in such manner that axle 25 is disposed at a greater distance from shaft 32 than axle 16, whereby a greater portion of the load is supported by drive wheels 17 for providing effective traction for said wheels.

By the provision of the spring leaves 38 associated in the manner disclosed the dead axle 25 is maintained in substantial alinement with axle 16, and the spring leaves 38 further function to resist the braking torque reactions on wheels 26 and further prevent possible fore and aft movement of axle 25 relative to axle 16, which movement would tend to set the brakes on wheels 26 as well as to seriously otherwise affect the desired operation of the construction. By the provision of the spring leaves 38 the above noted advantages are secured without substantially affecting the flexibility of the construction.

The multi-wheel construction just described utilizing spring assemblies 27 pivotally connected to axles 16 and 25 in underslung relation by hangers that are connected to the axles by universal joints, requires an arrangement for holding the axle 16 in proper position endwise and laterally of the frame since the spring connections are made so flexible that they cannot effectively serve these functions. Accordingly the present invention embodies novel means for positioning axle 16 and for resisting the torque reactions on said axle, whereby a highly flexible multi-wheel construction is provided from a standard vehicle construction embodying a Hotchkiss drive without requiring any change in the elements of the drive.

Said means, in a preferred embodiment thereof, comprises a pair of radius rods 39, whose forward ends are in close proximity and are connected for universal movement about the universal joint 22 in drive shaft 19, and whose rear ends are rigidly connected to axle 16 adjacent the opposite ends thereof, thus providing a substantially V-shaped positioning and torque resisting member, with the radius rods 39 diverging rearwardly of the vehicle frame, and the forward adjacent ends of which are united to the frame carried universal joint in a manner so that said ends can partake of universal movements about a center substantially coincident with the center of said frame carried universal joint.

The forward ends of radius rods 39 are preferably secured, as indicated at 41 in Figure 2, to a support 42 having universal or ball movement on a seat 43 which surrounds the universal joint 22 with the ball surface of the seat 43 concentric with joint 22, whereby both the shaft 19 and radius rods 39 will have a concentric universal connection with the frame for permitting free vertical movement as well as transverse rocking movement of drive axle 16. The seat 43 is secured to a transverse member 44 of the vehicle frame and embodies a midship bearing 45 for drive shaft 19 forwardly of and adjacent joint 22, as indicated in Figure 2.

The radius rods 39 may be secured to axle 16 in any desired manner, such as indicated in Figure 1, and illustrated in detail in Figure 3, wherein said connection embodies laterally directed extensions 39' of radius rods 39 which extensions are preferably angular and are disposed in contact with squared portion 16' of axle 16 and rest in corresponding cut out portions in the seats 35' of ball hangers 35, which seats embody half sections secured together by bolts 35" in the manner disclosed in my copending application Serial No. 383,414, the extensions 39' being welded or otherwise secured in position.

In order to lend sufficient rigidity to the rods 39 adjacent the angular ends thereof they may be connected intermediate their ends with the axle 16. Such connections may embody arcuate straps 47 suitably connected as by riveting at their forward ends to rods 39, as indicated at 43, and connected at their rear ends to axle 16 by means of U-bolts 49 and plates 51, which engage straps 47 adjacent retaining curved ends 52 thereof.

The rods 39 are illustrated in the form of angle irons, but may be constructed of flat spring steel, tubing, channel iron or any other suitable material.

Means are preferably provided for holding axle 16 centrally of the vehicle frame without in any way impairing the flexibility of the construction. Such means preferably comprises a tubular member 53 surrounding and rotatable on shaft 32 and a second relatively short tubular member 54 disposed at right angles to member 53 intermediate the ends thereof and suitably secured thereto as by welding. The forward end of tubular member 54 is disposed between axle 16 and shaft 32 and slidably receives a plunger 55, which is pivotally connected, as indicated at 56, between ears 57 rigid with the housing of axle 16.

The tubular members 53 and 54 are preferably reinforced by a "wishbone" band 58, which is welded, or otherwise suitably secured, at the apex thereof to member 54 adjacent the forward end thereof while the free ends of the opposite legs thereof are secured, as by welding, to member 53 adjacent the opposite ends thereof.

This construction provides a drag neutralizer and permits unrestricted movements of axle 16, except that said axle is restrained against lateral movement relative to the vehicle frame, such movement being otherwise possible because of the ball or universal connections with the spring hangers.

If desired, the construction disclosed in my copending application Serial No. 383,414, which functions in the same manner may be substituted for that herein disclosed embodying members 53 to 58.

By the construction just described it will be seen that a multi-wheel vehicle is provided from a standard vehicle embodying a Hotchkiss drive by the addition thereto of a non-driven axle and wheels supporting same, utilizing the Hotchkiss drive without change, though the axles are freed of rigid connections to the springs. At the same time a truck for supporting the rear portion of the extended frame is provided in which the springs are pivotally connected intermediate their ends to the vehicle frame, and connected to the axles at their opposite ends by ball hangers, whereby either end of either axle may be elevated or depressed with respect to the opposite ends as the wheels move over road irregularities without imposing undue strains in the springs secured thereto, while by suspending the springs from the axles in the manner disclosed the load carried by the vehicle is transferred to the axles through the depending hangers which serve to permit the springs to expand and contract freely, because the hangers are free to rotate about the axles functioning thus as spring shackles in usual form.

Thus it will be seen that the present invention provides a multi-wheel road vehicle construction having all the desirable characteristics in such constructions, and which can readily be fabricated from standard four wheel road vehicles embodying Hotchkiss drives by the utilization of many standard parts and the addition of relatively few simple additional parts.

In Figures 4 to 7 is disclosed a modified and at present preferred embodiment of my invention wherein a standard "Chevrolet" four wheel vehicle is converted into a multi-wheel vehicle construction of the same general character above disclosed, but in which, due to the peculiar standard construction, various novel constructions are provided for converting the standard four wheel vehicle into a multi-wheel vehicle construction of required stability and flexibility.

In accordance with this embodiment of the invention an extension frame, corresponding to extension frame 12, is secured to the standard frame 11 for providing the required length of frame for the longer wheel base provided by the addition of the dead axle.

Figure 5:
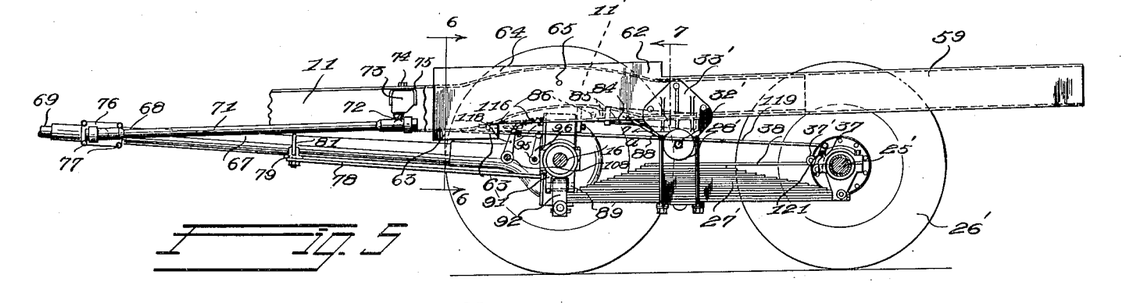
Figure 5 is a view corresponding to Figure 2 of the construction disclosed in Figure 4.

In standard Chevrolet constructions the frame 11 is provided with a kickup portion 11' immediately over the drive axle, as indicated in Figure 5, and the frame side channels are of different widths on either side of the kickup portion 11', the channel members being wider forwardly of the kickup portions than rearwardly thereof as is clearly indicated in said figure.

The kickup portion in the standard frame tends to weaken the extended frame, if the standard frame be extended in the manner above disclosed, and accordingly, a novel frame extension is provided which not only reinforces the kickup portions but further provides lateral supporting means for the body to be supported on the frame.

Figure 6:
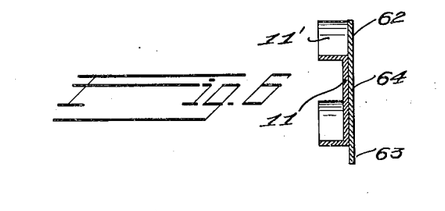
Figures 6 and 7 are respectively transverse sectional views on planes represented by lines 6—6 and 7—7 in Figure 5 particularly disclosing the vehicle frame construction.
Figure 7:
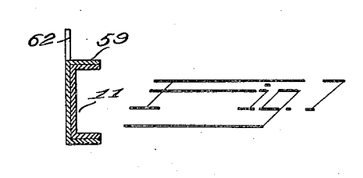

This extension frame, as illustrated in Figures 5 to 7, comprises a pair of laterally disposed channel members 59 of a width to telescope the rear or narrower portions of frame 11, as clearly indicated in Figure 7. The channel members 59 project substantially rearwardly of frame 11 in assembled relation therewith, and are interconnected at their rear ends by a cross member 61. The channel members 59 of the extension frame telescope with the corresponding channel members of the standard frame 11 from the rear ends thereof to the kickup portions 11' at which point the upper horizontal flanges of members 59 are cut into the web portions thereof. The severed flange portions are bent upwardly coplanular with the web portions, as indicated at 62 in Figures 5, 6 and 7, and the lower horizontal flanges of members 59 are cut into the web portions adjacent the inner ends of members 59 and adjacent the forward ends of kickups 11'. The severed flange portions are then bent into the planes of the web portions, as indicated at 63 in Figures 5 and 6, thus providing relatively long as well as relatively wide plate members 64 for engagement with the outer vertical faces of the opposite channel members of frame 11 at the kickup portions 11' thereof with the lower horizontal flanges of members 59 disposed beneath the kickup portions 11' to the points of intersection of said flanges with the arcuate flanges in kickup portions 11', as clearly indicated in Figure 5.

The extension frames of the character above disclosed are constructed prior to assembly and each of the plates 64 is provided with a hole 65 for registration with similar transversely alined holes in the portions 11' of the standard frame 11 which holes are present in the construction of standard Chevrolet frames. Thus when it is desired to provide an extended frame for multi-wheel vehicles, constructed from a standard Chevrolet four wheel vehicle, an extension frame of the character disclosed is obtained and is assembled with the standard frame 11 by telescoping same over the rear ends of the side channels of frame 11 until the holes 65 aline with the already existing holes in the standard frame after which a long bolt 65' is passed through the alined holes and a spacing tube 65'' disposed between the frame side channels and additional securing means of any desired character are employed for rigidly securing the extension frame to the standard frame 11.

Thus, it will be seen that a novel frame extension is provided which may be quickly and accurately assembled with the standard vehicle frame, and which reinforces the standard frame. Furthermore, the plate members 64 in assembled position extend substantially above the side channels of the standard frame 11, as indicated in Figure 5, thus providing lateral shoulders for engagement with the vehicle body for resisting transverse movement thereof relative to the vehicle frame.

Figure 4:
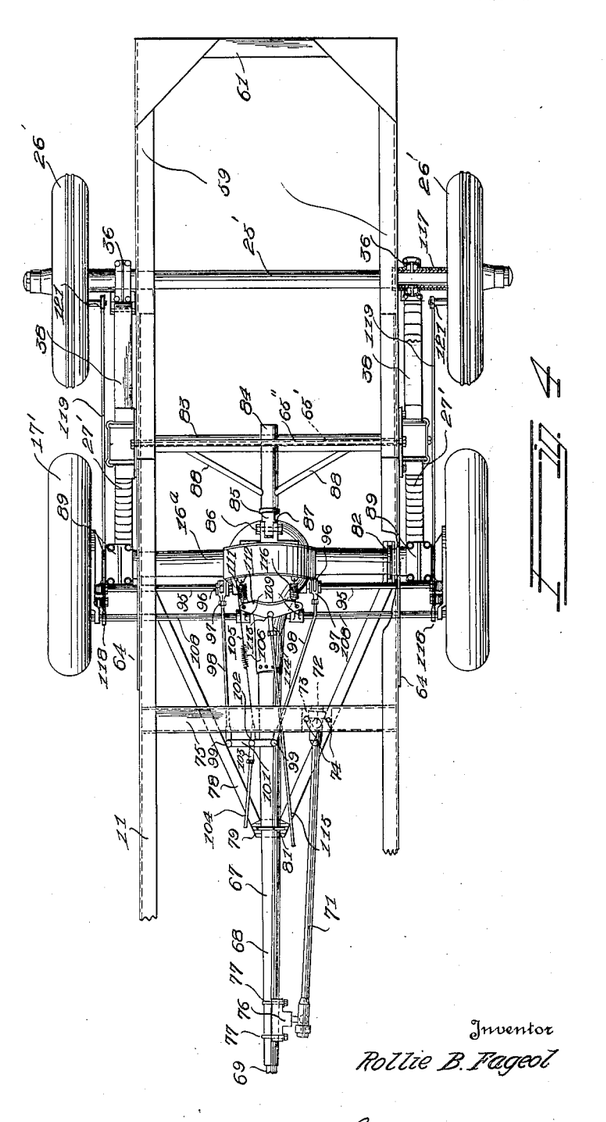
Figure 4 is a top plan view partially broken away of the chassis of a multi-wheel road vehicle constructed in accordance with a further and preferred embodiment of my invention.

In standard Chevrolet vehicle constructions a Hotchkiss drive is utilized and, as is well known, same embodies a telescoping tubular member surrounding the drive shaft. As indicated in Figure 4, the drive axle $16^a$ embodies a standard bevel gear drive operable by a drive shaft disposed within the tube 67 comprising telescopically connected sections 68 and 69 in well known manner. One of these sections 68 is rigid with the axle housing.

In order to position axle $16^a$ in this embodiment of the invention, which, due to the universal connections with the supporting springs in the manner above disclosed with reference to the previous embodiment of this invention and as hereafter referred to, a standard drag link 71 is disposed substantially parallel to and preferably closely adjacent to tube 67 and is flexibly connected at the rear end thereof through a ball and socket connection 72, the ball of which is carried by a block 73, which in turn is secured by bolts 74 within the channel of a transverse channel member 75 of the vehicle frame. The link 71 is flexibly connected at the forward end thereof by a similar ball and socket connection, the ball of which is carried by a bracket 76 rigidly secured to tube section 68 by means of U-bolts 77.

By the provision of the drag link 71 disposed and flexibly connected in the manner disclosed axle $16^a$ is maintained against movement longitudinally of the frame or about the pivotal connection of the supporting springs with the hangers while the necessary vertical and tilting movements of axle $16^a$ for maximum flexibility is in no way impaired.

The invention preferably embodies means for bracing tube 67 against lateral movement relative to axle $16^a$, which means preferably comprises a stay rod construction 78 of substantially V-shape in top plan and which, at the apex thereof, embodies a bracket 79 which is rigidly secured to tube 67 by means of a U-bolt 81, the bight portion of which engages tube 67 and the opposite ends of which extend through bracket 79, and which ends have suitable nuts applied thereto for drawing bolt 81 into firm engagement with tube 67. The laterally disposed ends of stay rods 78 are rigidly secured to axle 16ᵃ in substantially the same manner in which radius rods 39 are secured to axle 16, but preferably, said ends of rods 78 are disposed beneath axle 16ᵃ and rigidly secured thereto by U-bolts 82. Thus, by the provision of the stay rod construction the tube 67 is firmly braced or reinforced against lateral movement relative to axle 16ᵃ.

This embodiment of the invention also comprises means for maintaining axle 16ᵃ centrally of the vehicle frame in substantially the same manner as above disclosed in connection with the first embodiment of the invention. Such means comprising a tubular member 83 rotatably disposed on the trunnion shaft 32', and a second relatively short tubular member 84 disposed at right angles to tubular member 83 intermediate the ends thereof and suitably secured thereto as by welding. The forward end of tubular member 84 is disposed between axle 16ᵃ and shaft 32' for the slidable reception of a plunger 85 which is pivotally connected, as indicated at 86, between ears 87 rigid with the housing of axle 16ᵃ. The tubular members 83 and 84 are preferably reinforced by oppositely disposed bracing rods 88 rigidly secured at their opposite ends to tubular members 83 and 84.

The springs 27' are rotatably mounted on the opposite ends of trunnion shaft 32' through spring supporting saddles 28' in substantially the same manner as disclosed in the first embodiment of the invention, the shaft 32' being supported adjacent the ends thereof by bracket 33' secured to the channel members 59 of the frame extension.

The springs 27' are flexibly connected with axles 16ᵃ and 25' in underslung relation thereto substantially in the same manner as disclosed in the first embodiment of the invention. In accordance with this embodiment of the invention however, the spring assemblies 27' are flexibly connected with axle 16ᵃ by universal joint connections 89 embodying axle engaging sections 91 rotatably journaled on the axle and sections 92 pivotally connected with sections 91 for movement longitudinally of the axle and to the inner ends of which sections, the springs 27' are pivotally secured as indicated in Figure 5.

The springs 27' are connected with axle 25' by ball hangers 36 of the construction disclosed in the first embodiment of the invention and the axle 25' is positioned by the spring leaves 38 in the same manner. It is to be noted that the hangers 36 which are of two part construction may embody the lower or hanger section proper of standard ball hangers in Chevrolet constructions, and that the adjacent ends of springs 27' and spring leaves 38 are pivotally connected to the lower section and eye 37' of the cap section 37 by standard Chevrolet shackle pins, whereby it is only necessary to provide the cap portions 37 of the hangers 36 additional to existing standard parts for providing the ball hangers to which springs 27' and spring leaves 38 are pivotally connected.

The multi-wheel construction of this embodiment of the invention is provided with a novel braking arrangement comprising an internal emergency brake for the drive wheels and external service brakes for both the driven and non-driven wheels.

The braking arrangement, in a preferred form thereof, comprises transversely alined shafts 95 the opposite ends of which are rotatably journaled in suitable bearings supported by axle 16ᵃ, and brake shoe supporting members carried by the opposite ends of axle 16ᵃ adjacent wheels 17'. The outer ends of shafts 95 are operatively connected with brake shoes for engagement with the inner surface of brake drums carried by wheels 17'. Each of the shafts 95 adjacent the differential in axle 16ᵃ is provided with a lever arm 96, to which is pivotally secured a yoke 97, adjustably secured to an actuating rod 98, each of which rods is adapted through the associated arm 96 to impart rotation to the associated shaft 95 for moving the brake shoes associated therewith into frictional braking contact with the inner surface of the respective brake drum. The rods 98 project forwardly of axle 16ᵃ a substantial distance with the forward ends thereof being pivotally connected in transversely spaced relation, as indicated at 99, to the opposite ends of a transversely disposed equalizer bar 101. Pivotally secured, as at 102, to bar 101 intermediate pivotal connections 99 is a yoke member 103 adjustably secured to the rear end of an actuating brake rod 104, which projects forwardly of the vehicle and is operatively connected with an emergency brake lever in any desired or usual manner. The brake shoes are normally maintained in inoperative position by means of a rod 105 embodying a coil spring 106 and having the opposite ends thereof secured to axle 16ᵃ and bar 101, the spring 106 normally urging rods 98 rearwardly for holding the brakes in released position.

In accordance with the construction above disclosed forward movement of rod 104 through actuation of the emergency brake lever will impart like movement to bar 101 and rods 98 will also be moved to commensurate with the movement of rod 104 so long as the brake shoes actuated by each shaft 95 are out of contact with their respective brake drums. If, however, one of the brakes becomes set in advance of the other, the other brake will through the equalizing bar 101, be imediately set. In other words, the equalizing bar 101 in cooperation with rods 98 and 104 pivotally associated therewith as disclosed, provides a uniform braking action on both of the drive wheels 17', which not only effects a quicker stop but obviates the well recognized danger of skidding occasioned by a nonuniform braking action.

The service brakes comprise a pair of shafts 108 slightly in advance of shafts 95 and parallel therewith, whose opposite ends are also rotatably journaled in bearings supported by axle 16ᵃ and the brake shoe supporting members. Each of the shafts 108 is operatively connected with brake shoes for contact with the outer surface of the brake drums carried by wheels 17'. Each of said shafts adjacent the inner end thereof is provided with a lever arm 109 to the outer ends of which arms are pivotally secured, as indicated at 111, the opposite ends of an equalizing bar 112. Pivotally secured to bar 112 centrally of connections 111, as indicated at 113, is a yoke member 114, which is adjustably secured to a pedal actuated brake rod 115, which rod as well as bar 112, are normally maintained in rearward position by coil springs 116, the opposite ends of which are secured to bar 112 and axle 16ᵃ for normally maintaining the service brakes in inoperative position.

It will accordingly be seen from the foregoing that the service brakes due to the equalizer bar 112 are also uniformly set for providing uniform braking on wheels 17'.

The non-driven wheels 26' are preferably also provided with service brakes embodying wheel carried drums and axle supported brake shoes for braking contact with the outer surface of the drums, the brake shoes preferably being carried by members 117 integral with or rigidly secured to hangers 36, as indicated in Figure 4.

The brake shoes for wheels 26' are preferably actuated simultaneously with the service brake shoes cooperating with the respective drive wheels 17'. This is preferably effected in the following manner: Secured to each of the shafts 108 adjacent the outer end thereof is a lever arm 118 to which is pivotally secured the forward end of a rod 119, the rear end of which is pivotally secured to a lever arm 121 operatively associated with the brake shoes of the corresponding non-driven wheel 26'.

It will accordingly be seen from the foregoing disclosure that a novel braking arrangement is provided for a single drive multi-wheel vehicle, which comprises equalized emergency brakes and service brakes for the drive wheels and service brakes for the non-driven wheels, which are operatively connected with the service brake actuating means of the respective drive wheels.

In accordance with this embodiment of the invention a multi-wheel vehicle construction of maximum stability and flexibility may readily be constructed from standard four wheel Chevrolet vehicles. In constructing the multi-wheel vehicle from a standard four wheel vehicle the extension frame is added to the standard frame 11 in the manner hereinabove disclosed and prior to removing the standard springs, which position axle 16$^a$, the drag link 71 is connected in the manner above disclosed for holding tube section 68 and consequently axle 16$^a$ in position longitudinally of the frame and thus avoid the possible slipping of axle 16$^a$ due to the telescoping tube sections 68 and 69. After positioning axle 16$^a$ and adding the extension frame, the springs 27', axle 25' and other parts are assembled for providing the multi-wheel construction above disclosed. It is to be understood however that the invention is not limited to the construction of multi-wheel vehicles of the character disclosed from standard four wheel vehicles but the invention is also applicable to new constructions.

In Figures 8 to 11 inclusive are disclosed modified forms of the invention disclosed in Figures 1 and 2 in which modified forms of universal connections for springs 27 with axle 16 are shown. Such connections are also applicable to the modified form of the invention disclosed in Figures 4 to 7.

In accordance with the modification disclosed in Figure 8 the radius rods 39 are provided with rectangular cutouts 124 for seating engagement with the outer face and portions of the sides of the squared portions 16' of axle 16. The rods 39 are secured to axle 16 by U-bolts 125, whereby axle 16 is firmly secured to rods 39 and rods 39 project rearwardly of axle 16 providing spring suspension extensions 126.

The adjacent ends of springs 27 have a universal connection with extensions 126, which connections in Figure 8 comprise outer sections 127 pivotally connected at 128 to extensions 126 for pivotal movement parallel thereto, and inner sections 129 pivotally connected at 131 to sections 127 for pivotal movement transversely of extensions 126. The inner sections 129 are pivotally connected at 132 to the adjacent ends of springs 27.

This type of universal connection which is similar to the universal connection of springs 27' with axle 16$^a$ disclosed in Figures 4 and 5 offers the same universal movement as the ball hangers 35 disclosed in Figures 1 and 2, while at the same time simplifying the construction as the radius rods 39 are secured to axle 16 in a relatively simple manner and springs 27 are universally connected with extensions 126 of rods 39 by simple universal connections thus eliminating the more expensive ball hangers as well as providing a simpler and cheaper connection between rods 39 and axle 16.

If desired, the rear ends of the stay rod construction 78, disclosed in Figures 3 and 4, may be formed and connected with the drive axle in the manner disclosed in Figure 8.

Figure 9:
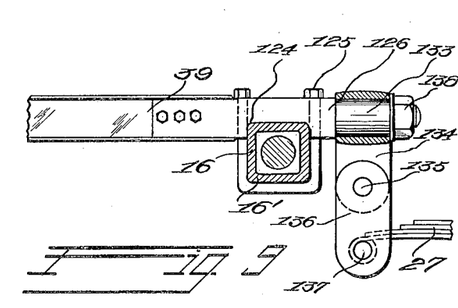
Figures 9 and 10 are similar views respectively disclosing further forms of spring suspensions.

In Figure 9 is disclosed a still further embodiment of the invention wherein extensions 126 are cylindrical, as indicated at 133, on which are journaled for transverse pivotal movement the hub portions of outer connecting members 134 to the inner ends of which members are pivoted at 135 for longitudinal movement, the outer ends of inner members 136, to the inner ends of which members are pivotally connected at 137, the adjacent ends of springs 27. The hub portions of members 134 are removably maintained on cylindrical extensions 133 by means of nuts 138. This construction provides a universal connection between springs 27 and rods 39 which function substantially in the same manner as the universal connection illustrated in Figure 8.

Figure 10:
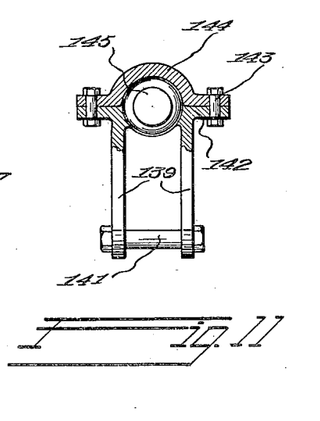
Figure 11:
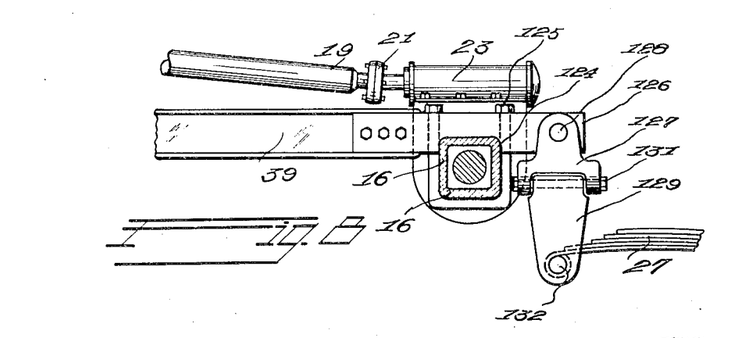
Figure 11 is an elevational view partly in vertical section of the spring hanger shown in Figure 10, the hanger being shown in operative suspended condition.

In Figures 10 and 11 is illustrated a still further form of universal connection or spring hanger, which is in the form of a ball shackle and comprises opposite plates 139 between which springs 27 are pivoted on pin 141. The plates 139 at their other ends are integral with a lower ball seat 142 to which is detachably secured by bolts 143 an outer ball seat 144, the ball seats 142 and 144 engaging for universal movement a ball 145 on rod extension 126.

This construction provides a universal spring connection very simple in construction while being well adapted to its intended use.

While the modified forms of universal hanger disclosed in Figures 8 to 11 are illustrated as modified embodiments of the construction disclosed in Figures 1 and 2, the constructions are equally applicable to the form of the invention disclosed in Figures 4 and 5 in which the ends of stay rod 78 may be secured to axle 16$^a$ and provided with extensions and associated universal hangers in the manner disclosed in Figures 8 to 11.

As is indicated in Figure 5 the pivotal connections of springs 27' with trunnion shaft 32' are preferably disposed nearer to axle 16$^a$ than to axle 25' in order that the major portion of the load may be carried by wheels 17' for providing sufficient traction to the drive wheels. This arrangement of the springs may be effected by the utilization of the standard Chevrolet springs or by providing special springs, as illustrated.

Figure 12:
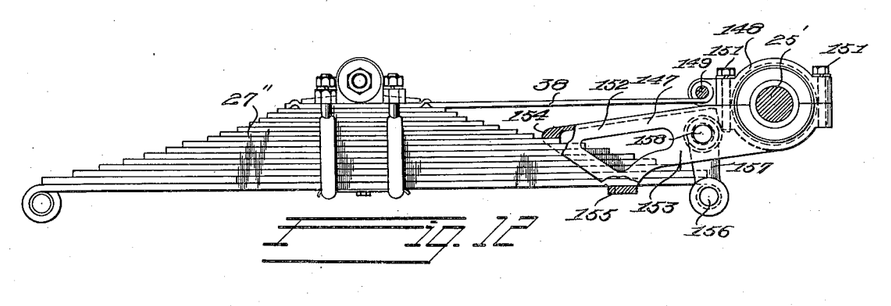
Figure 12 is a side elevational view partially in section of a modified form of spring and hanger therefor for suspending one end of the spring from the dead axle.

In Figure 12 is illustrated a standard Ford spring and spring mounting in operative association with a special ball hanger, whereby standard Ford springs may be utilized in the multi-wheel constructions above disclosed. As the standard Ford springs are of substantially symmetrical construction they could not be utilized in the manner disclosed in Figure 5 for effecting an unequal distribution of the load on the driven and non-driven wheels. Accordingly a special hanger 147 is provided for connection of the rear end of spring 27" with axle 25'. The hanger 147 comprises a cap portion 148 corresponding to the cap portion 37 in the previous forms of the invention, and to which spring leaf 38 is pivotally secured as indicated at 149. The lower portion of the hanger which is secured to the upper portion by bolts 151 comprises a forward spring guide extension 152, embodying opposite sides 153 between which the leaves of spring 27" are movably disposed. Extension 152 is provided with upper and lower transverse connecting bars 154 and 155 respectively which engage the upper face of one of the spring leaves and the lower face of the lower spring leaf of spring 27" respectively. The upper bar 154 further serves as a stop whereby engagement thereof by the adjacent end of the next upper spring leaf will limit movement of spring 27" in the direction of extension 152. The adjacent end of spring 27" is pivotally connected by a standard Ford shackle bolt 156 to the inner ends of standard Ford shackles 157, the outer ends of which shackles are disposed between side members 153 of extension 152 and pivotally connected therewith as by a second standard Ford shackle bolt 158.

In accordance with the foregoing construction standard Ford springs and the standard mountings therefor may be utilized in multi-wheel vehicles of the construction above disclosed in which the pivotal mountings of springs 27" with the vehicle frame is disposed closer to the drive axle than to the dead axle and in which the dead axle is prevented from imparting a twisting action on spring 27" as the spring guide extension 152 in cooperation with the supplemental spring leaf 38 will properly position axle 25' endwise of the frame. By the provision of shackles 157 the spring 27" is connected with hanger 147 in a manner to permit free flexing of the spring.

From the foregoing disclosure it will be seen that multi-wheel vehicle constructions are provided which are readily constructed from standard Hotchkiss drive four wheel vehicles at relatively low cost, and which are of maximum stability and flexibility, embodying a dual axle construction for supporting the rear end of the vehicle frame, which construction comprises a driven axle and a non-driven axle having universal connections with the opposite ends of suspended spring assemblies, and which spring assemblies have a pivotal connection intermediate said axles with the vehicle frame and the novel multi-wheel constructions embody relatively simple means for positioning the drive axle and resisting the driving and braking torque reactions on the drive axle as well as means for resisting the braking torque reactions on the non-driven axle.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:

1. A multi-wheel road vehicle including a frame; a drive and a dead axle supporting one end of said frame; underslung springs connecting said axles adjacent opposite sides of said frame; said springs being pivotally connected to said frame between their ends and attached to said axles by hangers pivotally attached to said axles and to said springs; a Hotchkiss drive shaft for said drive axle including a universal joint supported by said frame; a frame-like member to resist the torque reactions independently of said springs rigidly attached to said drive axle and to said frame supported universal joint in a manner such that said member is capable of movement about a center approximately coincident with the center of said joint; said member being formed to prevent said drive axle from moving endwise of said frame.

2. The combination defined in claim 1 in which said member is V-shaped with the legs of the V rigidly attached to said axle and the apex thereof being attached to said frame supported universal joint.

3. A multi-wheel road vehicle including a frame; a pair of axles arranged to support one end of said frame; a Hotchkiss drive shaft including a frame supported universal joint for one of said axles; a spring adjacent each side of said frame for yieldingly resisting movements of said axles; each of said springs being pivoted to said frame between its ends which are disposed lower than said axles; a hanger flexibly securing each spring end to an axle in a manner to permit the springs to expand and contract lengthwise; and means rigidly connected to the driven axle to resist the torque reactions and to position said axles endwise of said frame; said means being attached to said frame supported universal joint in a manner so that its point of connection is capable of universal movement with respect to a center approximating the center of said joint.

4. A road vehicle including a frame; a drive axle; a Hotchkiss drive shaft for said axle including a frame supported universal joint; means to position said axle and to resist the torque reaction thereon independently of the vehicle springs comprising a rigid V-shaped member attached at its apex to said frame supported universal joint so that the connection is capable of movement about the center of said joint and rigidly attached at its legs to said drive axle; springs for resiliently resisting the movements of said axle; said springs being connected to said legs of the member by flexible connections that freely permit the bending of said springs and all movements of said axle permitted by its connection to said frame.

5. The combination defined in claim 4 in which said flexible connection consists of hangers each connected to said member by a universal joint and pivotally connected to one of said springs.

6. The combination defined in claim 4 in which said member is constructed of elements that are clamped to said axle and fit in and are secured to channels constituting the legs of the V.

7. The combination defined in claim 4 including means to hold the axle centrally laterally of said frame; said means being flexible to permit all other movements of said axle allowed by its connections to said frame.

8. A road vehicle comprising a frame; a drive axle; springs attached to said frame; a Hotchkiss drive shaft for said axle; a tubular housing containing said drive shaft and rigidly extending from said axle; hangers connecting said axle and said springs; a link extending substantially parallel to said drive shaft; said link at one end being attached flexibly but inextensibly to said frame and extending away from said axle to be securely clamped upon said tubular housing at its other end; said link holding said axle in position endwise of said frame; and there being a member pivotally attached to said axle and telescopingly mounted in a sleeve pivotally attached to said frame for holding said axle centrally laterally of said frame without substantially interfering with movements of said axle in all other directions permitted by its connection to said springs and frame.

9. A multi-wheel road vehicle comprising a frame; a driven and non-driven axle supporting one end of said frame; springs pivotally connected with said frame intermediate their ends and universally connected at their ends to said axles; means independent of said springs and the drive connections for said driven axle for positioning said driven axle endwise of said frame; means for holding said driven axle against lateral movement with respect to said frame without restricting movement of said axle in all other directions with respect to said frame; and means interconnecting said non-driven axle and said springs for positioning said last named axle.

10. In a multi-wheel road vehicle, a frame; a pair of tandem axles arranged beneath the rear end of said frame; a rearwardly extending drive shaft including a frame-supported universal joint for driving one of said axles; a V-shaped member having its apex supported from the frame and its legs supported by and projecting beyond the forward one of said tandem axles; a spring pivoted between its ends at each side of the frame in such manner that the spring ends are lower than the axes of wheel rotation; a pair of hangers securing the rear ends of the springs to the rear axle; and a pair of hangers flexibly suspending the front ends of the springs from the ends of said projecting legs.

11. In the combination defined in claim 10, the apex of said V member being universally supported in substantial coincidence with said universal joint, and hangers suspended from said legs comprising universal connections.

12. A multi-wheel road vehicle comprising a frame, a drive axle and dead axle arranged to support one end of said frame, springs connecting said axles at each side of said frame, said springs being pivotally connected to said frame between the ends thereof so that the axis of the spring pivots and the axes of the axles lie approximately in the same horizontal plane under normal load conditions, torque resisting means positioning said drive axle longitudinally relative to said frame while permitting free swinging and tilting movement thereof, and means to substantially prevent movement of said drive axle transversely of the frame, said last named means permitting the movement of said axle in other directions so far as permitted by the torque resisting means and the springs that unite it yieldingly to said frame.

13. A multi-wheel road vehicle comprising a frame, a pair of axles arranged to support one end of said frame, a torque tube universally connected to said frame and rigidly secured to one of said axles to position said axle with respect to said frame, springs connecting said last named axle and the other axle at each side of said frame, said springs being pivotally connected to said frame between the ends thereof, and being connected to said axles by depending hangers that are connected to the axles by universal joints, and means to substantially prevent movement of one of said axles laterally of the frame, said last named means permitting the movement of said axles in other directions so far as permitted by the torque tube and the depending spring hangers that unite it yieldingly to said frame.

14. A multi-wheel road vehicle comprising a frame, a pair of axles arranged to support one end of said frame, springs interconnecting said axles and frame so that each of said axles may swing bodily about an axis extending transversely of said frame, and means to prevent movement of one of said axles laterally of the frame, said means being flexible to permit movement of said axle in other directions so far as permitted by the connection of said axle to said frame.

15. A multi-wheel road vehicle comprising a frame, a pair of axles arranged to support one end of said frame, springs pivotally connected between their ends to said frame, hangers united to each axle by means of universal joints, and connected to an end of one of said springs, means to substantially prevent movement of said axles endwise of said frame, and means to prevent shifting of one of said axles transversely of the frame, said last named means being flexible so as to permit the movement of said axle in other directions so far as permitted by the connection of said axle to said frame.

16. A road vehicle comprising a frame, an axle, springs interconnecting said axle and frame, hangers connected to the axle by universal joints and depending therefrom and connected to said springs, and a connection between said frame and axle preventing movement of said axle laterally of said frame, said connection consisting of a member mounted for rotation about an axis extending transversely of said frame, and rigidly secured from movement endwise of said axis, and a cylindrical member pivoted to said axle and telescopically associated with said element so that said axle is free to tilt and move endwise of said frame, but is prevented from moving laterally thereof.

17. A multi-wheel road vehicle comprising a frame, a pair of axles arranged to support one end of said frame, a spring pivoted between its ends to said frame at each side thereof, hangers united to each of said axles by universal joints and depending therefrom and secured adjacent an end of one of said springs so that the axis of the spring pivot and the axes of the axles under normal load conditions are disposed substantially in a horizontal plane, and means to prevent movement of one of said axles transversely of said frame, said means being flexible in a plurality of directions so as to permit movement of said last named axle in all directions permitted by its connections to said frame except laterally of the frame.

18. A multi-wheel road vehicle comprising a frame, a shaft extending transversely of said frame, a spring journalled on said shaft adjacent each side of the frame, a pair of axles arranged beneath said frame to support one end thereof, hangers united to each of said axles adjacent each side of said frame by universal joints and depending therefrom and each connected to an end of one of said springs, and means to prevent lateral movement of one of said axles, said means consisting of an element journalled on said shaft and prevented from endwise movement thereon and provided with a cylindrical portion, and a member pivotally attached to said axle and provided with an extension rotatably telescoped with said cylindrical portion, whereby said axle is capable of movement in all directions permitted by its connection to the frame except laterally thereof.

19. In a multi-wheel road vehicle construction, a frame; a pair of axles arranged in tandem beneath one end of said frame; an extremely flexible suspension system for mounting said frame upon said axles, said system permitting free tilting and endwise movement of the axles laterally relative to the frame; and means, in addition to said suspension system, for positively preventing the endwise axle movement that would be permitted by the said suspension system.

20. In the apparatus defined in claim 19, said suspension system comprising beams having universal connection with the ends of the axles, whereby the latter are free to move within determined limits laterally of the frame.

ROLLIE B. FAGEOL.